(12) United States Patent
Altaber et al.

(10) Patent No.: US 7,098,780 B2
(45) Date of Patent: Aug. 29, 2006

(54) DEVICE FOR FIXING A TIRE MONITORING SYSTEM MODULE TO A WHEEL

(75) Inventors: Gerard Altaber, Ceyrat (FR);
Jean-Pierre Francois, Romagnat (FR);
Bernard Lonquety, Paris (FR);
Philippe Poret, Crecy-la-Chapelle (FR)

(73) Assignees: Michelin Recherche et Technique, S.A., Granges-Paccot (CH); WABCO France, Claye-Souilly (FR)

( * ) Notice: Subject to any disclaimer, the term of this patent is extended or adjusted under 35 U.S.C. 154(b) by 478 days.

(21) Appl. No.: 10/366,060

(22) Filed: Feb. 13, 2003

(65) Prior Publication Data

US 2003/0151503 A1 Aug. 14, 2003

(30) Foreign Application Priority Data

Feb. 13, 2002 (FR) ................................... 02 01964
May 15, 2002 (FR) ................................... 02 06130

(51) Int. Cl.
*B60C 23/00* (2006.01)
(52) U.S. Cl. ..................... 340/447; 73/146; 73/146.5
(58) Field of Classification Search ............. 340/572.1, 340/447, 572.8; 152/152.1, 375
See application file for complete search history.

(56) References Cited

U.S. PATENT DOCUMENTS

| 4,254,398 A | * | 3/1981 | Matsuda et al. ............. 340/448 |
| 5,285,189 A | | 2/1994 | Nowicki et al. ............. 340/447 |
| 5,838,229 A | | 11/1998 | Robinson, III .............. 340/442 |

FOREIGN PATENT DOCUMENTS

| FR | 2429114 | 1/1980 |
| GB | 1301359 | 12/1972 |

* cited by examiner

*Primary Examiner*—Daniel Wu
*Assistant Examiner*—Travis Hunnings
(74) *Attorney, Agent, or Firm*—Fitzpatrick, Cella, Harper & Scinto

(57) ABSTRACT

A device for fixing to a wheel a module intended to measure and transmit to a receiver, in particular by radio link, at least one quantity characteristic of the state of a tire mounted on the wheel, in particular its inflation pressure, comprising connecting means rigidly connected to the module and means of attaching the connecting means to the wheel, such that the module is fixed radially internally relative to a seat and a hook on the rim of the wheel, and such that the attachment means are fitted to apply the connecting means against the radially inner surface of the rim hook with an adaptable clamping stress of intensity greater than a given value.

18 Claims, 4 Drawing Sheets

DEVICE FOR FIXING A TIRE MONITORING SYSTEM MODULE TO A WHEEL

BACKGROUND OF THE INVENTION

1. Field of the Invention

The present invention relates to a device for fixing a tire monitoring system module to a wheel of a vehicle.

2. Description of the Related Art

The Sicurezza Stradale Technology firm's "Tyre Check" device comprises a module fixed to the wheel disk by two lugs clamped under two consecutive nuts. The module is pneumatically connected to the valve and comprises a radio transmitter linked to a receiver on board. The mode of installation of the lugs under the wheel nuts suffers from the disadvantage of inducing strong vibrations when the nuts are tightened with shock wrenches (shop tightening). These vibrations may damage the electronics of the module. Furthermore, as the axial dimension of the wheels in question increases, the quality of the link between the module and the receiver is degraded because the adjacent rim well and rim hook together with the disk of the wheel form a metal hollow rendering communication by radio link more difficult.

U.S. Pat. No. 5,285,189 uses a fixation of the module in the rim well. This fixation device comprises a metal strap encircling the rim well of the wheel rim and clamping the module. The position of the module in the rim well is not favorable to good communication by radio link between the module and the receiver in the chassis of the vehicle. That position also involves dangers of damage to the module at the time of mounting or removing tires on or from the wheel bearing the module.

U.S. Pat. No. 5,838,229 uses a fixation of the module to the foot of a wheel valve. Consequently, the module is likewise arranged inside the tire cavity, substantially in the rim well as before.

BRIEF SUMMARY OF THE INVENTION

The present invention relates to a device for fixing a tire monitoring system module to a wheel of a vehicle. The tire monitoring module can measure characteristics of the tires, such as, for example, the pressure of the tires. The tire monitoring module is able to transmit at least one quantity characteristic of the state of the tires to a receiver, such as by radio link. The receiver, for example, can be arranged in the chassis of a vehicle.

One object of the present invention is to provide dependable transmission of electromagnetic signals by radio link between the modules and the receivers, and dependable mechanical fixation of the module to the wheel.

The device, according to the invention, comprises connecting means rigidly connected to the module and attachment means for attaching the connecting means to the wheel. The device is such that it is adapted to fix the module radially internally relative to a wheel rim seat and hook, and such that the attachment means are adapted to apply the said connecting means against the radially inner surface of said rim hook with an adaptable clamping stress of intensity greater than a given value.

This module position has the advantage of arranging the module near the axial extremity of the wheel, that is, in a place where the cavity effect of the metallic surroundings of the module will only slightly interfere with radio transmission. This position is also close to the valve opening of the tire, permitting use of a pneumatic connection of very short length, on the order of only a decimeter or so, between the module and the valve opening. The fixation of the wheel module with an adaptable, that is to say adjustable, clamping stress, of the connecting means against the rim hook surface, allows the device according to the invention to be insensitive to the usual variations in shape and thickness of wheel rim hooks. This is a further assurance of dependability of the fixation.

This fixation device also has the advantage that it can be mounted on any vehicle, without any adaptation or modification of the wheels in question.

The clamping stress is preferably greater than 2500 N. This has the advantage of ensuring a mechanically dependable fixation of the module.

According to a preferred embodiment, the connecting means comprise a plate rigidly connected to the module and a connecting piece rigidly connected to the plate and suitable for arrangement against the radially inner face of the rim hook.

The connecting means may also comprise a single connecting piece rigidly connected to the module and suitable for arrangement against the radially inner face of the rim hook.

Advantageously, the connecting piece is adapted to come into contact with the radially inner face of the rim hook in at least two areas of support located on either side of the hollow of the rim hook.

This has the advantage of ensuring a stable fixation of the connecting piece against the inner face of the rim hook.

According to a preferred embodiment, the attachment means comprise a generally U-shaped fixation "clip" whose first end is intended to come to rest against the radially outer face of the rim hook, and a second end of which is intended to come to rest against the connecting piece. Preferably, the first end of the fixation clip is tapered. This is to ensure that, in service, the outer face of the tire bead adjacent to this end of the clip will not be damaged in case of contact.

The geometry of the fixation clip may be adapted to develop clamping stresses due to the elastic deformation of the clip of intensity greater than 2500 N when placed around the connecting piece and the radially uppermost face of the rim hook.

Alternatively, the second end of the fixation clip may comprise a means of applying a given clamping stress between the clip and the connecting piece.

It is advantageous for the reliability of the fixation device that the direction of application of the clamping stress intersects the opposed branch of the U of the fixation clip.

Preferably, when the connecting piece has a first face intended to be applied against the radially inner face of the rim hook and a second face opposed to the first, said second face is adapted so that the plane tangent to said second face at the point of application of the clamping stress is substantially perpendicular to the direction of application of said clamping stress.

The means of applying a given clamping stress may be a setscrew arranged through one end of the fixation clip. This setscrew may have a diameter of 5 mm and be emplaced with a tightening torque greater than 2 N.m.

In a preferred embodiment, the fixation device according to the invention is intended especially to fix modules to steel sheet wheels for commercial vehicles.

It is understood that both the foregoing general description and the following detailed description and figures are exemplary and explanatory only and are not restrictive of the invention as claimed. The accompanying drawings, which are incorporated in and constitute a part of the specification,

DETAILED DESCRIPTION OF THE PREFERRED EMBODIMENTS

Reference will now be made in detail to the presently preferred embodiments of the invention, which serve to explain the principles of the invention.

Figure 1:
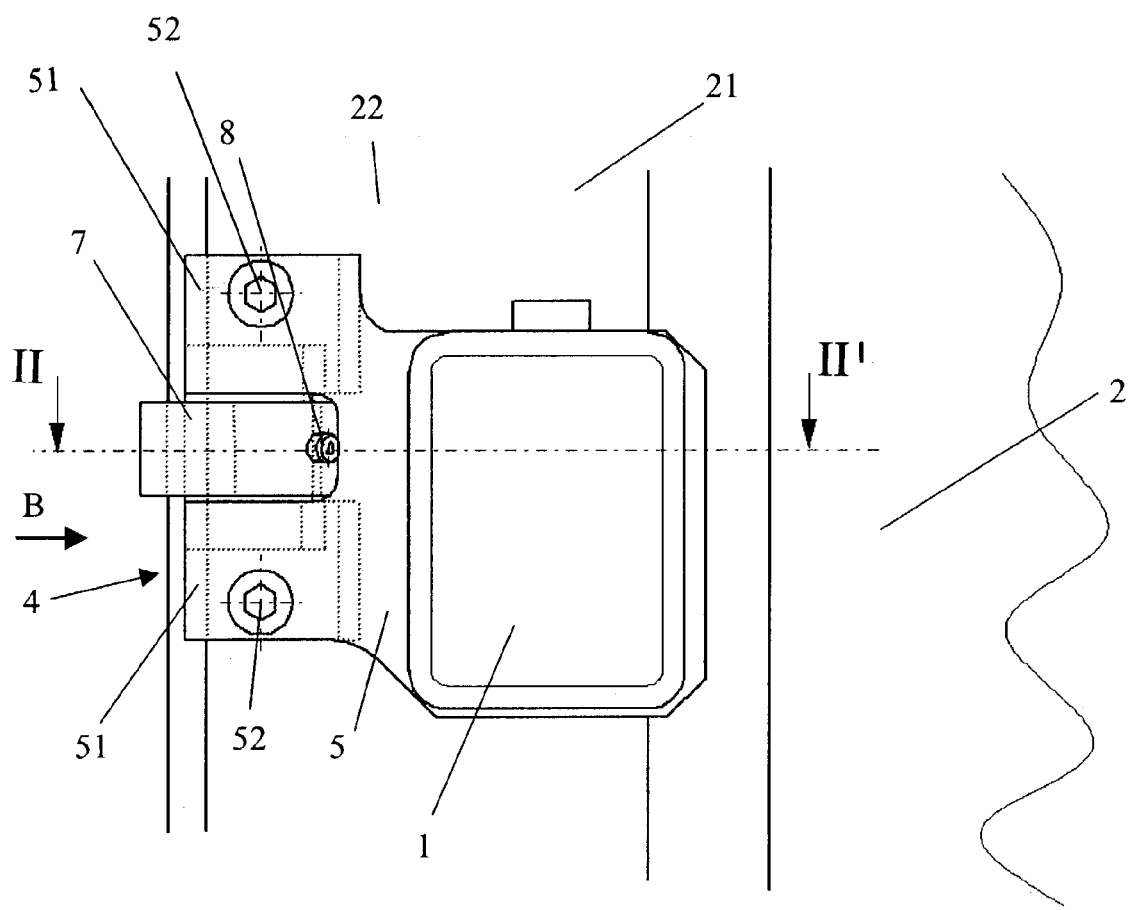
FIG. 1 is a front view of a fixation device according to the invention and of a module, mounted on a rim hook.
Figure 2:
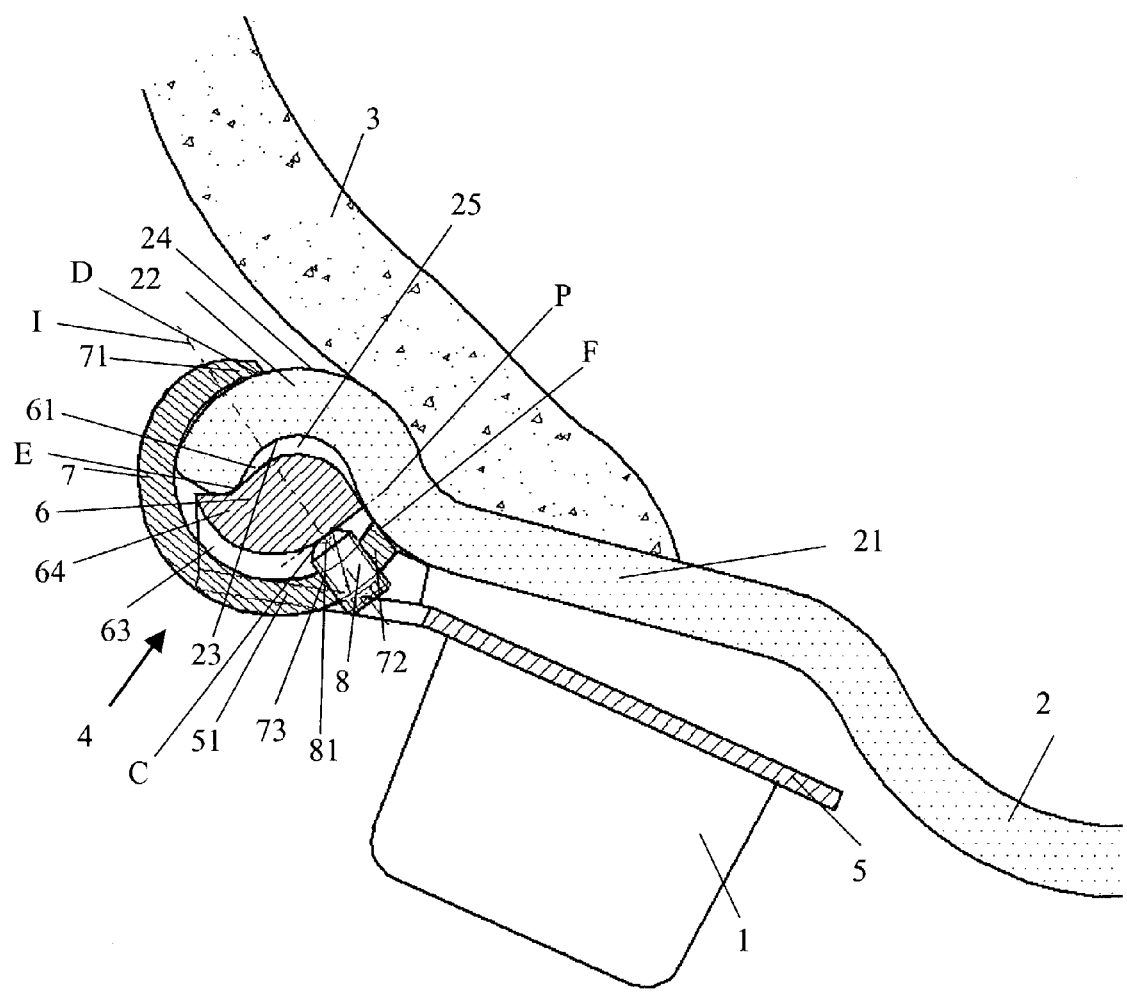
FIG. 2 is a sectional view at II–II' as indicated in FIG. 1.

FIGS. 1 and 2 show a module 1 fixed under a seat 21 of the wheel rim 2 by the fixation device 4 according to the invention. FIG. 2 is a section at II—II' in FIG. 1.

In the description, the axis of rotation of the wheel is taken as reference for the "axial" and "radial" directions.

In FIG. 2, we see a tire bead 3 in place on a seat 21 and hook 22 of a wheel rim 2. The module 1 is fixed radially under the rim seat 21 by the device 4. This device 4 comprises connecting means composed of a plate 5, on which the module 1 is fixed, and a connecting piece 6. The device 4 also comprises attachment means, which in the present embodiment, comprises a fixation clip 7 and a setscrew 8.

The plate 5 is a metal plate with two lugs 51 to be fixed to the connecting piece 6 by two screws 52 (FIG. 1).

Figure 3:
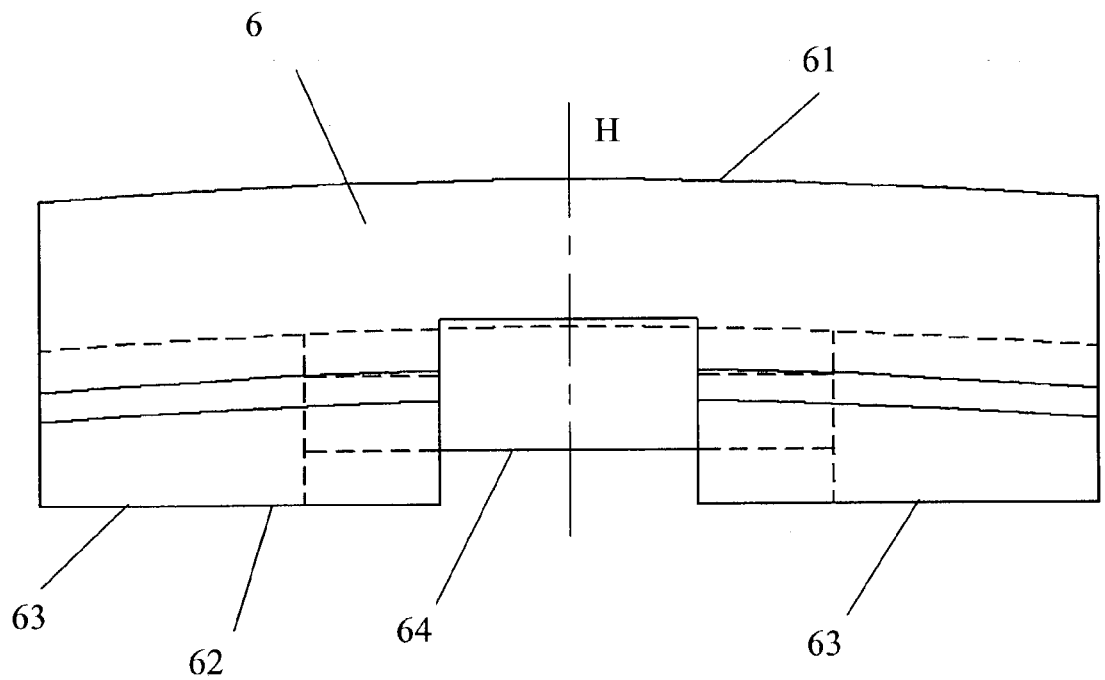
FIG. 3 is a front view in direction B as indicated in FIG. 1.

The connecting piece has a first face 61 arranged against the radially inner face 23 of the rim hook 22. As shown in FIG. 3, the connecting piece 6 has a second face 62 opposed to the first face 61. The first face 61 is of suitable geometry to be arranged against the radially inner face 23 of the rim hook 22, in both directions, axial and circumferential, of the rim hook 22. The second face 62 has two plane lateral parts 63 connecting with the plate 5 and a recessed central part 64. The plane of symmetry H, shown in FIG. 3, of the connecting piece 6 corresponds to the plane of section of FIG. 2. The connecting piece may advantageously be made of a cast metal alloy.

Figure 4:
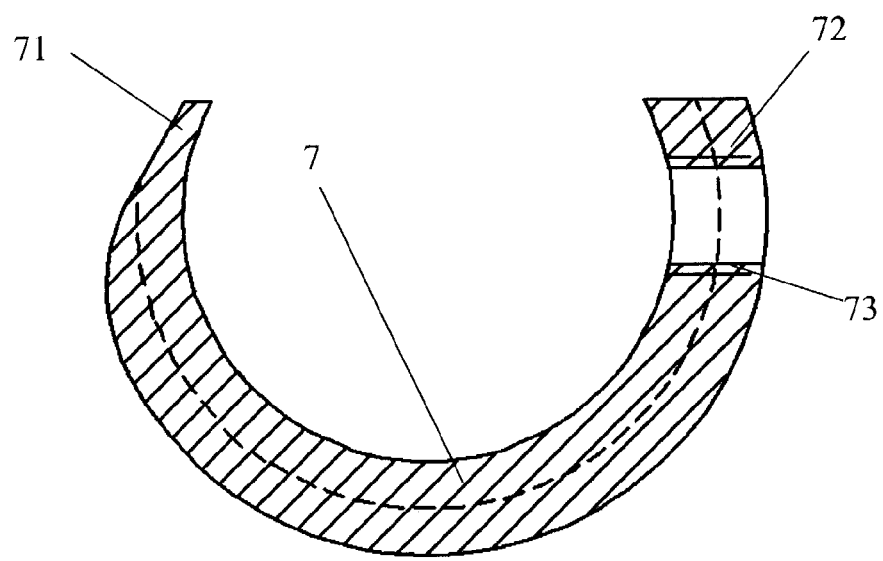
FIG. 4 is a view of a fixation clip.

FIG. 4 shows a view of a fixation clip 7 having a generally U-shape with a first end 71 and a second end 72. In this embodiment, the first end 71 is tapered to come to rest against the radially outer face 24 of the rim hook 22. The second end 72 has threading 73 intended to receive a setscrew 8. It is to be noted that the centerline of the thread 73 intersects the second branch of the U. As shown in FIG. 2, the end 81 of the setscrew comes to bear against the central part 64 of the second face 62 of the connecting piece 6. At the time of fixing the module 1, the setscrew 8 is applied with a given torque, preferably greater than 2 N.m for a setscrew of 5 mm diameter, resulting in a clamping force greater than 2500 N. This very high stress is necessary in order for the module 1 to remain well in place under service stresses on the wheel and tire. The fixation clip preferably consists of an elastic steel.

FIG. 2 also specifies the preferred bearing areas between the parts of the device 4. The deformation of the fixation clip 7 due to tightening of the setscrew 8 results in clamping stresses in at least two preferred bearing areas of contact. The first area of contact is at C, the area of contact between the ends 81 of the setscrew 8 and the face 64. At C, for the sake of good transmission of the clamping stress, the plane P tangent to the face 64 is substantially perpendicular to the centerline I of the thread 73. The direction of application of the clamping stress at C substantially coincides with the centerline I.

The second area of contact is at D, the area of contact between the first end 71 of the fixation clip and the radially outer face 24 of the rim hook 22. Since the centerline of the thread 73 intersects the second branch of the U of the fixation clip, the area of application D is shifted axially inward relative to said thread centerline, and so the fixation clip will duly roll around the rim hook and connecting piece, ensuring a very reliable fixation, since in order for the clip to leave its position, it has to increase its spread and so increase the clamping stress.

FIG. 2 also shows that the bearing points between the connecting piece 6 and the radially inner face 23 of the rim hook 22 are preferably divided between at least two areas E and F arranged on either side of the hollow 25 of the rim hook 22. In the example shown, the area F extends axially away from the inner side of the rim hollow 25. This ensures a good fixation of the connecting piece 6 against the hook 22, and the absence of any movement of the connecting piece 6, and hence of the module 1, which would tend to carry it towards and away from the rim seat 21 in service. In a preferred embodiment, the thickness of the plate is enough to prevent any appreciable amplitude of vibrations of the plate 5 in service. In a more preferred embodiment, the thickness of the plate 5 is 2 mm The module 1 ordinarily comprises an assembly of components such as pressure and temperature sensors, means of processing measurements of the sensors, means of transmitting these measurements to a receiver, such as a radio transmitter, located for example in the vehicle, and means of energy supply such as a battery or a cell. These components are well known to one skilled in the art. The assembly of these components is connected in a casing of small size and mass, preferably on the order of 80 g. The module 1 also comprises an outlet (not shown) for pneumatically connecting the pressure sensor to the inner hollow of the tire by way of a pneumatic connection such as an inflation valve (not shown).

Figure 5:
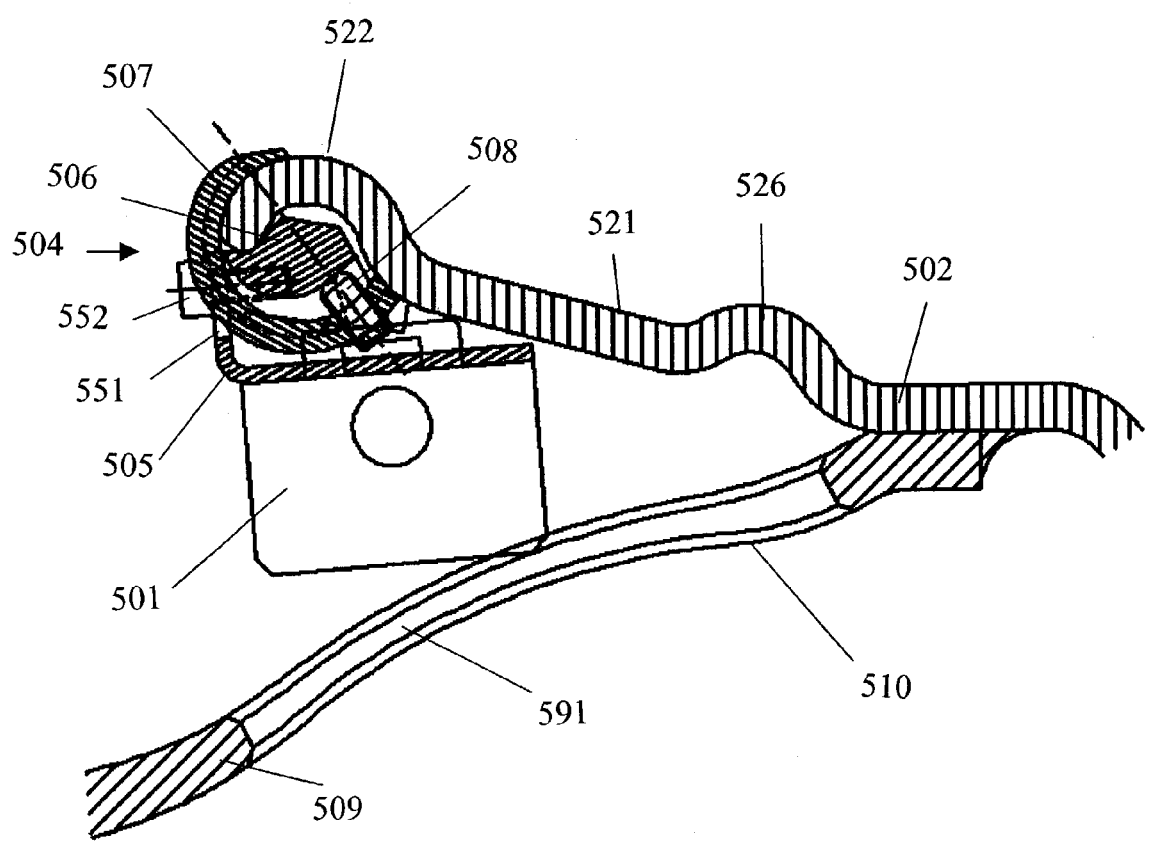
FIG. 5 is a sectional view, similar to FIG. 1, of a second example of a fixation device according to the invention and of a module, mounted on a rim hook.

FIG. 5 shows a second embodiment of the fixation device 504, according to the invention, for fixing a module 501 to a rim 502 of a standard sheet steel wheel 510 of a commercial vehicle. The wheel 510 is made up of a rim 502 and a disk 509. The disk 509 and the rim 502 are assembled by welding in a transition area between the rim well and a hump 526 located at the axially inner end of the seat 521. The device 504 comprises connecting means comprising a plate 505, to which is fixed the module 501, and a connecting piece 506. The device 504 also comprises attachment means comprising a fixation clip 507 and a setscrew 508.

This embodiment is distinguished from the preceding embodiment in that the plate 505 is substantially L-shaped. Consequently, the two lugs 551 of the plate 505 are fixed to the axially outer part of the connecting piece 506 (by screws 552) instead of the radially inner part as in the case of the plate 5. This permits placing the module 501 directly under the hook 522 of the rim 502. The module must be placed facing an opening 591 of the disk 509 to permit its emplacement.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A device for fixing, to a vehicle wheel, a module intended to measure and transmit to a receiver, at least one quantity characteristic of the state of a tire mounted on the wheel, the device comprising:
   connecting means rigidly connected to the module, and
   attachment means for attaching the connecting means to the wheel, such that the module is capable of being fixed radially internally relative to a hook and seat of the rim of the wheel,
   and wherein the attachment means are adapted to apply the connecting means against the radially inner surface of the rim hook with an adjustable clamping stress of intensity greater than a given value.

2. The device according to claim 1, wherein the clamping stress is greater than 2500 N.

3. The device according to claim 1, wherein the connecting means comprises a plate rigidly connected to the module and a connecting piece rigidly connected to the plate and adapted to be arranged against the radially inner face of the rim hook.

4. The device according to claim 3, in which the connecting piece is adapted to come into contact with the radially inner face of the rim hook and at least two bearing areas located on either side of the hollow of the rim hook.

5. The device according to claim 3, in which the attachment means comprises a fixation clip having a first end, which is intended to come to bear against the radially outer face of the rim hook, and a second end, which is intended to come to bear against the connecting piece.

6. The device according to claim 5, in which the first end of the fixation clip is tapered.

7. The device according to claim 5, in which the geometry of the fixation clip is adapted to develop clamping stresses due to the elastic deformation of the clip when placed around the connecting piece and the radially upper face of the rim hook.

8. The device according to claim 6, in which the second end of the fixation clip comprises a means of applying a given clamping stress between the clip and the connecting piece.

9. The device according to claim 8, in which the direction of application of the clamping stress intersects the opposed branch of the U of the fixation clip.

10. The device of claim 5 wherein the fixation clip is generally U-shaped.

11. The device according to claim 3, in which, when the connecting piece has a first face intended to be applied against the radially inner face of the rim hook and a second face opposed to the first, the second face is adapted so that the plane P tangent to the second face at the point of application C of the clamping stress is substantially perpendicular to the direction of application I of the clamping stress.

12. The device according to claim 11, in which the means of applying a given stress is a setscrew arranged through the second end of the fixation clip.

13. The device according to claim 12, in which the setscrew is a setscrew 5 mm in diameter emplaced with a tightening torque greater than 2 N·m.

14. The device according to claim 1, wherein the connecting means comprises a single connecting piece rigidly connected to the module and adapted to be arranged against the radially inner face of the rim hook.

15. The device according to claim 1, in which the wheel in question is a wheel of sheet steel for a commercial vehicle.

16. The device according to claim 1, in which, while the wheel comprises a disk with openings, the module is fixed facing an opening of the disk.

17. The device according to claim 1, wherein the quantity characteristic of the state of the tire is the inflation pressure of the tire.

18. The device according to claim 1, wherein the quantity characteristic of the state of the tire is the temperature of the tire.

* * * * *

UNITED STATES PATENT AND TRADEMARK OFFICE
CERTIFICATE OF CORRECTION

| | | |
|---|---|---|
| PATENT NO. | : 7,098,780 B2 | Page 1 of 1 |
| APPLICATION NO. | : 10/366060 | |
| DATED | : August 29, 2006 | |
| INVENTOR(S) | : Gerard Altaber et al. | |

It is certified that error appears in the above-identified patent and that said Letters Patent is hereby corrected as shown below:

Column 6

Line 1, "claim 6," should read --claim 5,--.

Signed and Sealed this

Tenth Day of July, 2007

JON W. DUDAS
*Director of the United States Patent and Trademark Office*